(12) United States Patent
Carro

(10) Patent No.: US 7,240,209 B2
(45) Date of Patent: Jul. 3, 2007

(54) METHODS OF INVISIBLY EMBEDDING AND HIDING DATA INTO SOFT-COPY TEXT DOCUMENTS

(75) Inventor: Fernando Incertis Carro, Valencia (ES)

(73) Assignee: International Business Machines Corporation, Armonk, NY (US)

( * ) Notice: Subject to any disclaimer, the term of this patent is extended or adjusted under 35 U.S.C. 154(b) by 764 days.

(21) Appl. No.: 10/480,955

(22) PCT Filed: Apr. 25, 2002

(86) PCT No.: PCT/EP02/05460

§ 371 (c)(1),
(2), (4) Date: Dec. 1, 2003

(87) PCT Pub. No.: WO02/102055

PCT Pub. Date: Dec. 19, 2002

(65) Prior Publication Data

US 2004/0236716 A1    Nov. 25, 2004

(30) Foreign Application Priority Data

Jun. 12, 2001    (EP)    ................... 01480048

(51) Int. Cl.
*H04L 9/00*    (2006.01)

(52) U.S. Cl. ................ 713/179; 713/180; 713/176
(58) Field of Classification Search ................ 713/179, 713/180, 176
See application file for complete search history.

(56) References Cited

U.S. PATENT DOCUMENTS 5,499,294 A    3/1996    Friedman ................. 380/10

(Continued)

FOREIGN PATENT DOCUMENTS

HU    223895 B1    3/2005

(Continued)

OTHER PUBLICATIONS

A data-hiding technique with authentication, integration, and confidentiality for electronic patient records Hui-Mei Chao; Chin-Ming Hsu; Shaou-Gang Miaou; Information Technology in Biomedicine, IEEE Transactions on vol. 6, Issue 1, Mar. 2002 pp. 46-53.*

(Continued)

*Primary Examiner*—David Jung
(74) *Attorney, Agent, or Firm*—Schmeiser, Olsen & Watts; William H. Steinberg

(57) ABSTRACT

Method of invisibly embedding and hiding data into a text document by modifying selected invisible attributes of invisible characters on a plurality of inter-word intervals, comprising the steps of selecting (10) at least one attribute that is invisible on the space characters used as inter-word intervals, transforming (14) the document into a canonical form by setting on all inter-word intervals the values of the selected attribute to the same default value, encoding (18) the data to be embedded and hidden into the document as an ordered set of values corresponding to the different values of the selected attribute, selecting (20) a set of inter-word intervals among all inter-word intervals corresponding to a set of space characters and replacing (22) on each space character of this set of space characters, default attribute values by the corresponding encoded data.

18 Claims, 3 Drawing Sheets

U.S. PATENT DOCUMENTS

| | | | | |
|---|---|---|---|---|
| 5,629,770 | A | 5/1997 | Brassil et al. | 358/261.1 |
| 5,958,051 | A | 9/1999 | Renaud et al. | 713/200 |
| 6,005,643 | A | 12/1999 | Morimoto et al. | |

FOREIGN PATENT DOCUMENTS

| | | |
|---|---|---|
| JP | 11-007240 | 1/1999 |
| JP | 2000-338870 | 12/2000 |
| JP | 2002-189715 | 7/2002 |
| WO | WO 97/14087 | 4/1997 |
| WO | WO 00/77677 A2 | 6/2000 |
| WO | WO 02/102055 A1 | 12/2002 |

OTHER PUBLICATIONS

Data hiding in binary image for authentication and annotation Min Wu; Bede Liu; Multimedia, IEEE Transactions on vol. 6, Issue 4, Aug. 2004 pp. 528-538.*

Protocols for data-hiding based text document security and automatic processing Deguillaume, F.; Rytsar, Y.; Voloshynovskiy, S.; Pun, T.; Multimedia and Expo, 2005. ICME 2005. IEEE International Conference on Jul. 6-8, 2005 pp. 4 pp.*

Bender et al. "Techniques for Data Hiding," *IBM Systems Journal*, vol. 35, Nos. 3-4, 1996 pp. 313-335.

Brassil et al "Electronic Marking and Identification Techniques to Discourage Document Copying," *IEEE Journal on Selected Areas in Communications*, vol. 13, No. 8, Oct. 1995, pp. 1495-1503.

Dittman t al. "H2O4M—Watermarking for Media: Classification, Qualilty Evaluation, Design Impprovements," *Proceedings of the 2000 ACM Workshops on Multimedia*. pp. 107-110 (2000).

Kohl et al. "Security for the Digital Library-Protecting Documents Rather than Channels," *Database and Expert Systems Applications*. Aug. 26-28, 1998, pp. 316-321.

Krawczyk et al. "HMAC: Keyed-Hashing for Message Authentication," Feb. 1997, pp. 1-11.

Lacy et al. "Music on the Internet and the Intellectual Property Protection Program," *ISIE '97*, Jul. 7, 1997.

"Secure Hash Standard," Federal Information Processing Standards Publication 180-1. Apr. 17, 1995, pp. 1-18.

Su et al. "Digital Watermarking of Text, Image, and Video Documents," *Computers and Graphics, Pergamon Press, Ltd.* vol. 22, No. 6, Dec. 1998.

International Search Report dated Aug. 20, 2002 for corresponding PCT application No. PCT/EPP02/05460.

* cited by examiner

METHODS OF INVISIBLY EMBEDDING AND HIDING DATA INTO SOFT-COPY TEXT DOCUMENTS

RELATED APPLICATION

This application is a national stage application of and claims priority from PCT Application PCT/EP02/05460, filed Apr. 25, 2002, which claims priority from European Application No. 01480048.6, filed Jun. 12, 2001. These disclosures are hereby incorporated by reference herein in their entireties. The above PCT International Application was published in the English language and has International Publication No. WO 02/102055 A1.

TECHNICAL FIELD

The present invention relates to the embedding and hiding of data into soft-copy text documents, such as embedding the integrity information of a text document into the document itself in an invisible manner, and relates in particular to an improved method of doing so.

BACKGROUND

In the current environment of computer networks characterized by an exponential growth in the circulation of electronic text documents such as e-mails over unsecured media (e.g., the Internet), a key issue is authentication. It is not always possible for the recipient of an electronic text document to make sure of its origin and that no one should be able to masquerade as someone else. It is also necessary to verify that it has not been modified, accidentally or maliciously, during transmission.

Accordingly, methods have been proposed to perform such an authentication. The standard solution, which fits well with electronic text documents, consists in adding an integrity information in the form of a Message Authentication Code (MAC)to soft-copy text documents. A MAC is a digest computed with a one-way hash function over the text and which is also made dependent on a key, e.g., a secret-key known only by the sending system and the receiving system so that the latter can check first, that the received document has well been originated by whom shares the secret-key, and second, that the document has not been altered. For example, Secure Hash Algorithm or SHA specified by the National Institute of Standards and Technologies, NIST, FIPS PUB 180-1, "Secure Hash Standard", US Dpt of Commerce, May 93, produces a 160-bit hash. It may be combined with a key e.g., through the use of a mechanism referred to as HMAC or Keyed-Hashing for Message Authentication, subject of the RFC (Request For Comment) of the IETF (Internet Engineering Task Force) under the number 2104. HMAC is devised so that it can be used with any iterative cryptographic hash function, including SHA. Therefore, a MAC can be appended to the soft-copy of a text document so as the whole can be checked by the recipient.

Obviously, this method that assumes the addition of checking information to a file has the inconvenience of indeed separating text and checking information. Thus, this information can easily be isolated and removed intentionally, in an attempt to cheat, or accidentally just because intermediate pieces of equipment or communication protocols in charge of forwarding the electronic documents are not appropriate to handle this extra piece of information.

Then, the checking information should rather be encoded transparently into the body of the text document itself (i.e., in a manner that does not affect text format and readability whatsoever). So, it remains intact across the various manipulations it is exposed to on its way to the destination, still enabling the end-recipient to authenticate the document.

Another type of approach to authentication which applies mainly to soft-copy images (which thus may also be used on the image of a hard-copy text document) consists in hiding data into their digital representation, meeting thus the above requirement that checking information should better be merged into the document itself. Data hiding, a form of steganography, that embeds data into digital media for the purpose of identification, annotation, tamper-proofing and copyright has received a considerable attention, mainly because of the copyrights attached to digital multimedia materials which can easily be copied and distributed everywhere through the Internet and networks in general. A good review of data hiding techniques is in '*Techniques for data hiding*' by W. Bender and al. published in the IBM Systems Journal, Vol. 35, Nos 3&4, 1996. An illustration to the way data hiding may be carried out is the replacement of the least significant luminance bit of image data with the embedded data. This technique which indeed meets the requirement of being unnoticeable (i.e., the restored image is far to be altered to a point where this would become noticeable) may serve various purposes similar to authentication, including watermarking, aimed at placing an indelible mark on an image, or tamper-proofing, to detect image alterations especially through the embedding of a MAC into the soft-copy image. However, having to consider a text as an image would be a very costly and inadequate solution in terms of storage and bandwidth necessary to transmit it. Thus, specially adapted methods have been proposed for encoding and hiding data into soft-copy textual documents.

As described in the above article by Bender, the text encoding and data hiding methods are either open space methods, which handle white spaces (blanks or spaces), or syntactic methods that utilize punctuation and contractions, or semantic methods, that encode data using manipulation of the words themselves, or steganographic methods, that encode data by modifying graphical attributes, like those known as line-shift coding, word-shift coding or feature coding methods, that operate by introducing small controlled variations on the spaces between lines, between words or on the bitmap images of characters on a text.

Open space methods that are based on the manipulation of white spaces and more specifically, inter-word blank characters, inserted by the originator of a text document have been considered as the most simple and convenient way of marking a text that is susceptible to be authenticated, without the addition of a separated MAC, since the information necessary for the checking is then imbedded, somehow hidden, into the text itself, that the casual reader is unlikely to take notice of. These methods are basically based on the idea of encoding and hiding information into a text by inserting, or in a more broad sense, by modifying the "number of blanks" on subsets of (cryptographically selected or not) intervals of the original input text.

However, inserting or deleting blanks for encoding information on a text has the main drawback of modifying and distorting the format of the original input text. Moreover, acting on the number of blanks on the intervals of a text to encode binary information usually requires to assign one inter word interval to encode a single bit. Thus, depending on the amount of information to encode, in order to apply those methods large size texts may be required.

As a conclusion, from the analysis of all above referenced methods for encoding and hiding data on soft-copy texts, a common characteristic to all of them consist in that they are based on encoding information by modifying, in a way or another, some visible features of the original text (e.g., by modifying the number of inter-word spaces, by changing or moving punctuation symbols, by shifting positions of words or lines, by modifying the form of text fonts, by using alternative words, etc.). Thus, all those encoding and data hiding methods modify the format or the visual appearance of the original input text, being thus potentially noticeable when editing.

SUMMARY OF THE INVENTION

Accordingly, the main object of the invention is to achieve a method of invisibly encoding and hiding data such as integrity information into a soft copy text document keeping unchanged the format and visual appearance of the text document.

Another object of the invention is to achieve a method of invisibly encoding and hiding data into a soft copy text document maximizing the volume of information that could be merged and hidden into soft-copy text documents.

The invention relates therefore to a method of invisibly embedding and hiding data into a text document by modifying selected invisible attributes of invisible characters on a plurality of inter-word intervals of the text document, comprising the steps of: selecting at least one attribute that is invisible on the space characters used as inter-word intervals, transforming the text document into a canonical form by setting on all inter-word intervals the values of the selected attribute to the same default value, encoding the data to be embedded and hidden into the text document as an ordered set of values corresponding to the different possible values of selected attribute, selecting a set of inter-word intervals among all inter-word intervals in the text document corresponding to a set of space characters to he used for embedding and hiding the data into the text document, and replacing on each space character of the set of space characters, default attribute values by the corresponding encoded data.

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION OF THE INVENTION

The principle of the invention is that different invisible parameters can be modified on the inter-word or space characters of a text without affecting the format and the visual appearance of the original text. Such parameters correspond to text (or character) attributes, including the font type, text color, italic bold or protected attributes of the space characters or any combination thereof.

Figure 1:
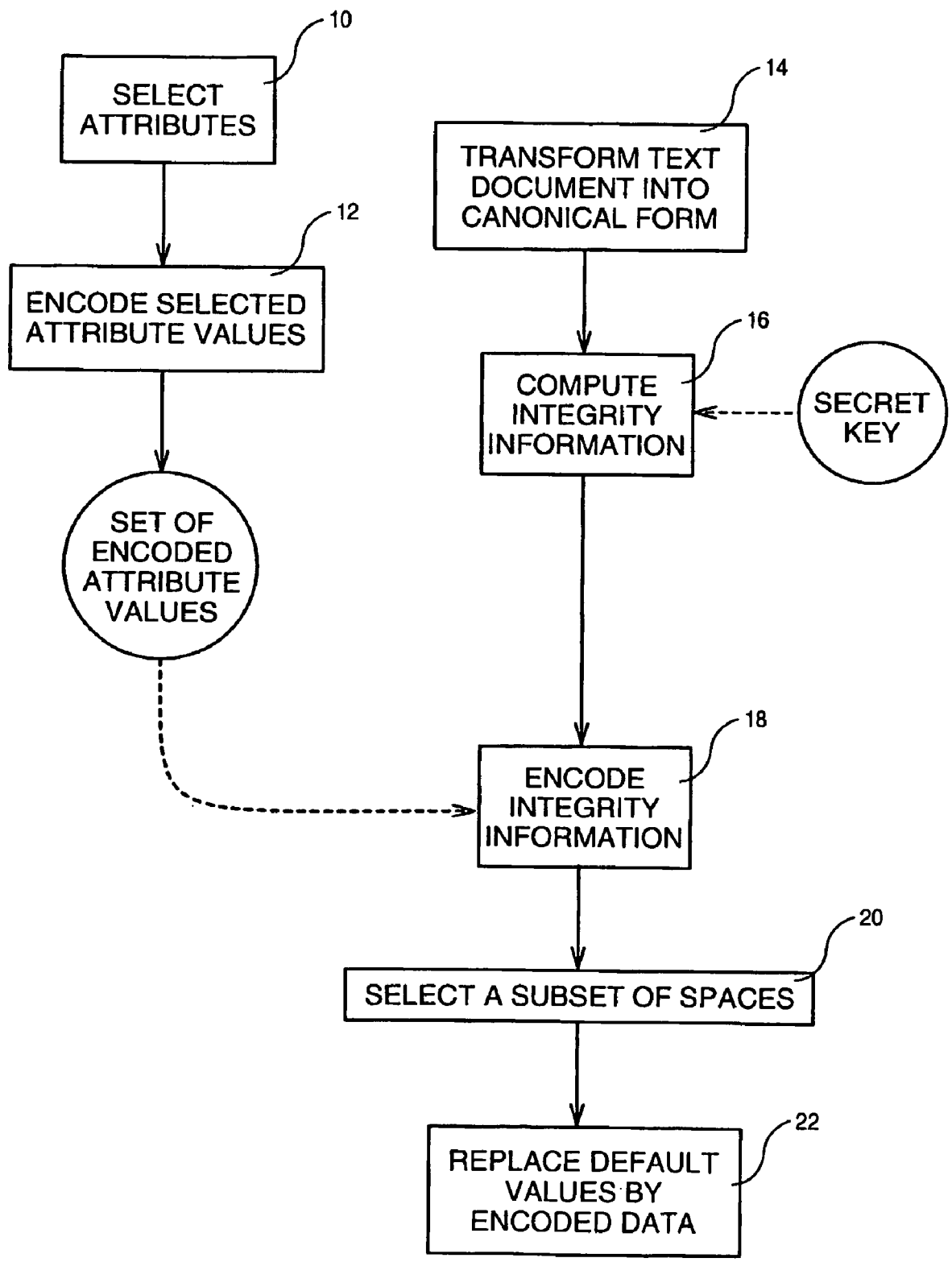
FIG. 1 is a flow chart of the method for embedding and hiding integrity information into a text document according to the invention.

According to the method of the invention the flow chart of which is illustrated in FIG. 1, one or several attributes which are invisible on the space characters of the text document are selected (step 10). A preferred embodiment of the invention consists in selecting the single text color attribute. Thus, as many different choices as the number of colors in the palette of colors can be invisibly encoded in a single space of a text.

Then, a selected set of attribute values is encoded by establishing a correspondence or mapping table between the selected set of attribute values and the digits representing the data to be embedded (step 12).

| ENCODED VALUE | COLOR ATTRIBUTE |
|---|---|
| 1 | GRAY |
| 2 | DARK GRAY |
| 3 | RED |
| 4 | DARK RED |
| 5 | YELLOW |
| 6 | DARK YELLOW |
| 7 | GREEN |
| 8 | DARK GREEN |
| 9 | CYAN |
| 0 | DARK CYAN |
| NONE | BLACK |

Note that the color attribute could be combined with another attribute such as italic. The selection of the couple formed by text color and italic will enable to have as many different choices as the number of combinations of colors in the palette of colors and italic/non italic.

The text document where the data is to be embedded is transformed into a canonical form (step 14) by setting on all spaces of the text at least one of the selected attributes to the same default value. Thus, with the selection of the color attribute, this one is set to the (default) BLACK color for all space characters. In such a case, all space characters have by default the WHITE attribute for the background color. Note that setting a default value on any space character means that no information has been encoded on this space.

Assuming that the data to be embedded is the integrity information corresponding to the Message Authentication Code (MAC) of the text document, such an integrity information is computed by using a secret key (step 16), and this integrity information is then encoded by using the set of encoded attribute values (step 18) to obtain an ordered set of attribute values.

Thus, assuming that the integrity information is the following sequence of 32 decimal figures.

73350293214855841097644612360091 using the above correspondence or mapping table between the decimal figures and the color attribute values, results in the following ordered set of encoded attribute values. GREEN(7), RED(3), RED(3), YELLOW(5), DARK CYAN(0), DARK GRAY(2), CYAN(9), RED(3), DARK GRAY(2), GRAY(1), DARK RED(4), DARK GREEN (8), YELLOW(5), YELLOW(5), DARK GREEN (8), DARK RED(4),GRAY(1),DARK CYAN(0), CYAN(9), GREEN(7), DARK YELLOW(6), DARK RED(4), DARK RED(4), DARK YELLOW(6), GRAY(1), DARK GRAY(2), RED(3), DARK YELLOW(6), DARK CYAN(0), DARK CYAN(0), CYAN(9), GRAY(1)

Lastly, after having selected the subset of spaces among the inter-word intervals of the text document to be used for encoding (step 20) (generally consecutive intervals from the beginning of the text document), the default values of the attributes are replaced by the corresponding encoded attribute values of the ordered set of encoded attribute values for each space character of the selected subset of spaces (step 22).

As a result of the method according to the invention, the invisibly authenticated text is identical to the original text when displayed or printed. Moreover, since the integrity information is embedded in the actual data, nobody can inadvertently misplace the integrity information which always goes with an electronic version of the text document.

Figure 2:
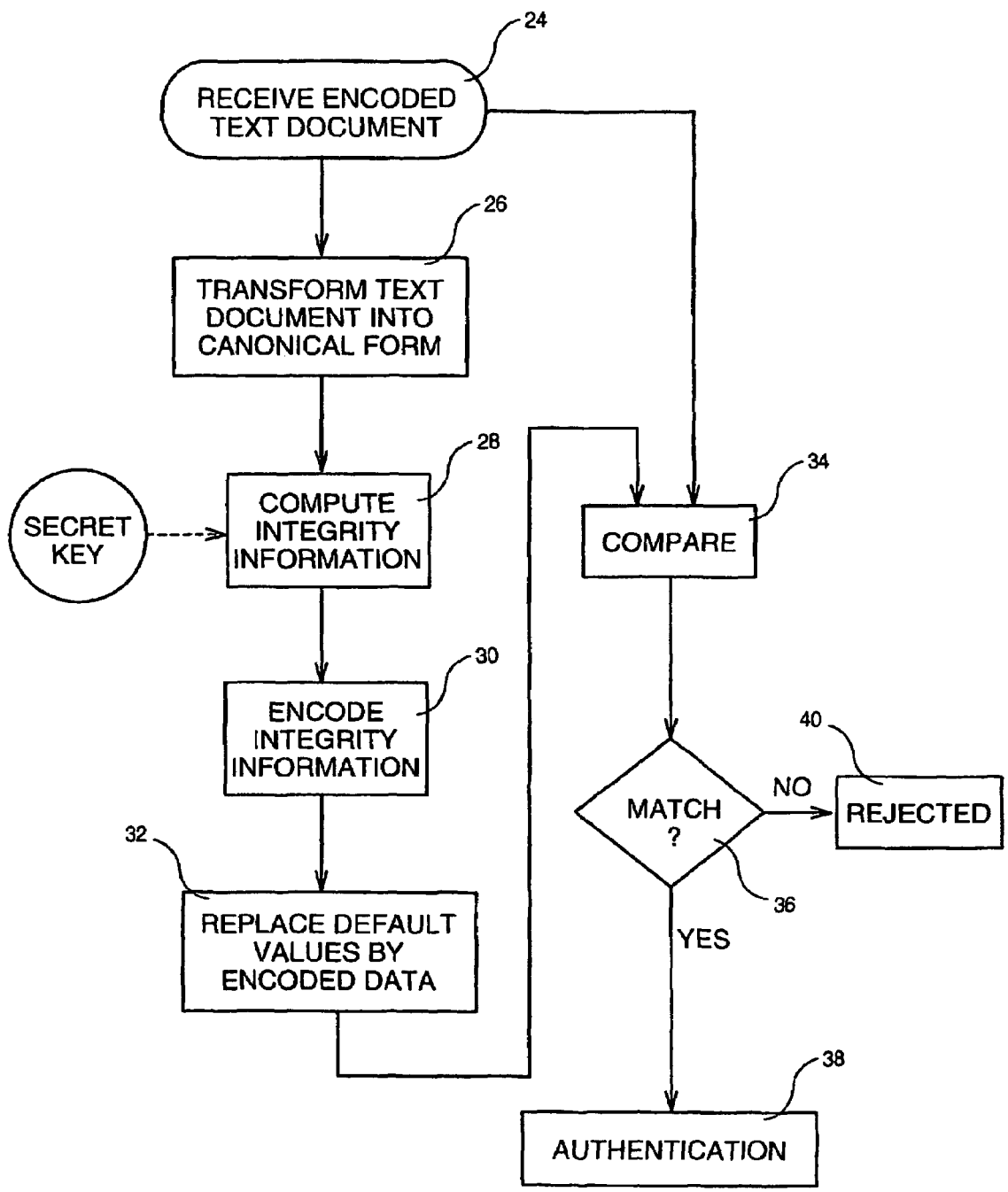
FIG. 2 is a flow chart representing a first embodiment of the method for making the authentication of a text document which has been processed according to the method illustrated in FIG. 1.

When an invisibly encoded text document processed according to the above method is received by the receiving communication system, a checking method has to be used to authenticate the text document. Two embodiments of this checking method can be used. In the first embodiment illustrated in FIG. 2, after receiving the encoded text document (step 24), this document is transformed into canonical form, as previously, by setting on all spaces of the received text the selected attribute(s) to the same default value (step 26). Again, the integrity information of the canonical text is computed by using the same secret key as in the method illustrated in FIG. 1 (step 28) and this integrity information is encoded by using the same set of encoded attribute values (step 30) in order to obtain an ordered set of encoded attribute values.

The default values of the attributes in a predetermined subset of spaces among the inter-word intervals of the canonical text document are replaced, for each space character, by the corresponding encoded attribute values of the ordered set of encoded attribute values (step 32) to get an encoded text document. Note that the predetermined subset of spaces must be identical to the subset of spaces which has been selected when the received text document has been encoded. This is not a problem if this subset corresponds to consecutive inter-word intervals from the beginning of the document.

Then, the received text document is compared with the encoded text document (step 34) to check whether there is a match between them (step 36). If so, there is authentication of the received text (step 38). If not, the received text is rejected (step 40).

Figure 3:
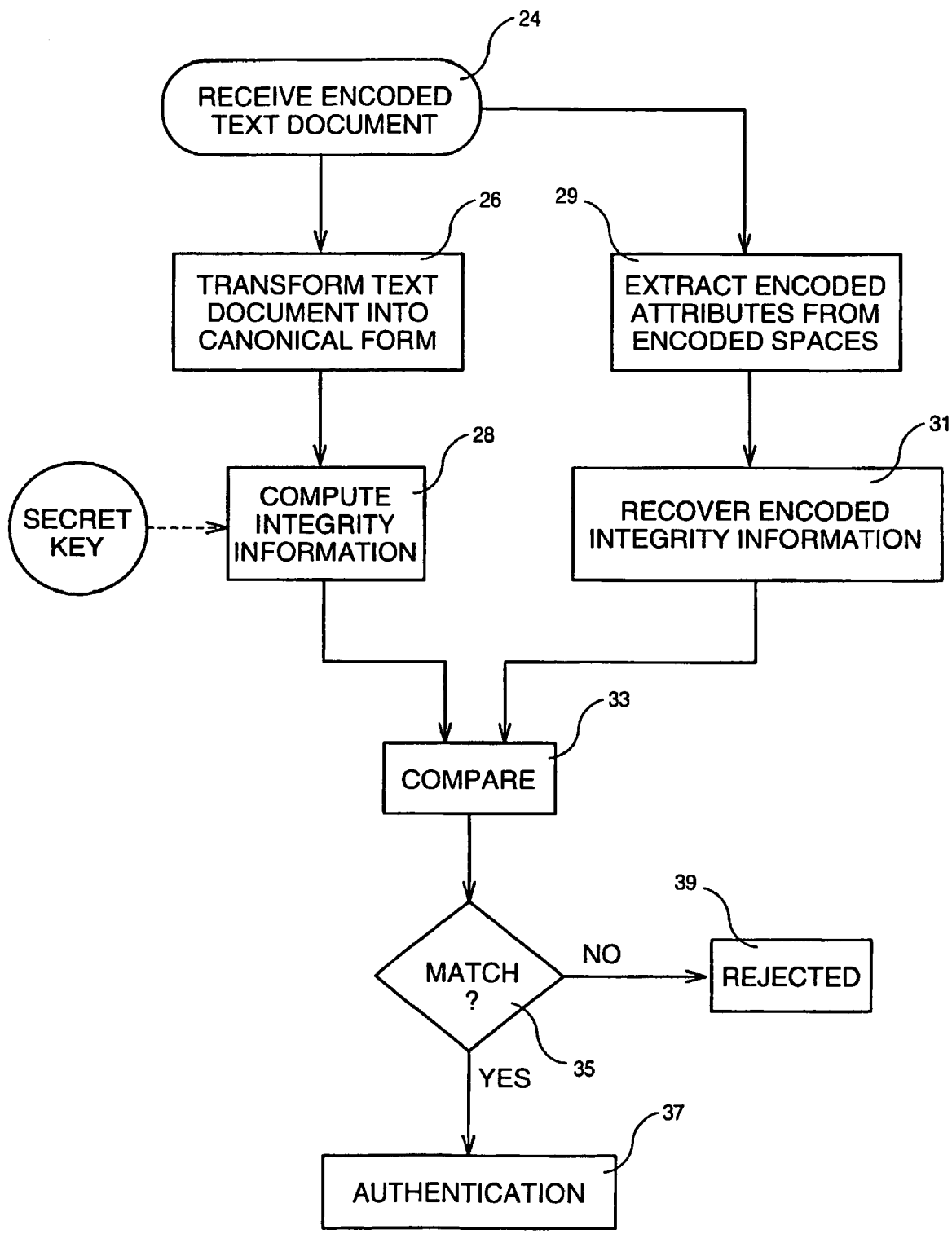
FIG. 3 is a flow chart representing a second embodiment of the method for making the authentication of a text document which has been processed according to the method illustrated in FIG. 1.

In the second embodiment illustrated in FIG. 3, after receiving the encoded text document (step 24), this document is transformed into a canonical form (step 26) and the integrity information is computed (step 28) in the same way as for the first embodiment. But instead, the encoded attributes are extracted from the encoded spaces of the predetermined subset of spaces in the received text document (step 29). Then, the encoded integrity information is recovered from the selected subset of encoded spaces (step 31).

Then, the integrity information recovered from the received document is compared (step 33) with the computed integrity information of the canonical form in order to check (step 35) whether there is a match between them. If so, there is authentication of the received text (step 37). If not, the received text is rejected.

In the above example wherein the selected attribute is text color, there is no problem to encode data represented in the decimal base insofar as there are more than 10 colors to represent the decimal figures 0, 1 . . . 9.

Assuming that a different attribute is selected wherein there are less than 10 possible choices, such an attribute would not be useful for the data to be embedded in the decimal base. Even in such a case, it would be possible to use such an attribute provided that the data is represented according to a numerical base N lesser than the number of different possible attribute values. Thus, if there are 5 different possible choices for the selected attribute, the data will be represented in the 5-base with figures 0–4. Of course, such a representation of the data requires to reserve more spaces in the text document for encoding information than by using, for instance, a decimal base.

Another possibility to use an attribute allowed to take only a few number of different values is to combine it with another attribute. As an example, the above attribute taking 5 values could be combined with another attribute, such as italic/non italic, having two possible choices, to represent the 10 figures (0 to 9) of the data encoded in the decimal base.

For example,following correspondence or mapping table associate a pair of attributes, for instance the color attribute and the italic/non-italic attribute, to hexadecimal digits:

| ENCODED VALUE | COLOR ATTRIBUTE | ITALIC ATTRIBUTE |
| --- | --- | --- |
| 0 | CYAN | NO |
| 1 | DARK CYAN | NO |
| 2 | RED | NO |
| 3 | DARK RED | NO |
| 4 | YELLOW | NO |
| 5 | DARK YELLOW | NO |
| 6 | GREEN | NO |
| 7 | DARK GREEN | NO |
| 8 | CYAN | YES |
| 9 | DARK CYAN | YES |
| A | RED | YES |
| B | DARK RED | YES |
| C | YELLOW | YES |
| D | DARK YELLOW | YES |
| E | GREEN | YES |
| F | DARK GREEN | YES |
| NONE | BLACK | Don't care |

Note that, in any case, communication systems exchanging text documents in electronic form (soft copy) must be compatible for using the invention. It is so for almost all modern office and e-mail products. It is also important to note that, even if a system does not support colors (but only black and white texts), it would be even possible to encode invisible information on the blanks of a plain text by using for encoding one or a combination of several different possible attributes like the font type, italic, bold or protected.

The invention claimed is:

1. A method of invisibly embedding and hiding data into a text document by modifying selected invisible attributes of invisible characters on a plurality of inter-word intervals of the text document, comprising:

selecting at least one attribute that is invisible on space characters used as inter-word intervals, transforming the text document into a canonical form by setting values of the selected attribute to a same default value on all inter-word intervals of the document, encoding the data to be embedded and hidden into the text document as an ordered set of values corresponding to the different values of the selected attribute, selecting a set of inter-word intervals among all inter-word intervals in the text document corresponding to a set of space characters to be used for embedding and hiding the data into the text document, and replacing on each space character of the set of space characters, default attribute values by the corresponding encoded data.

2. The method according to claim 1, wherein the data is integrity information used for authentication of the text document, the integrity information being computed with the use of a secret key.

3. The method according to claim 1, wherein the data to be embedded is encoded by using a set of attribute values, the set of attribute values being encoded by establishing a correspondence table between the attribute values and the digits representing the data to be embedded.

4. The method according to claim 3, wherein the data to be embedded is a sequence of figures which can be each one of figures 0, 1, 2, . . . , N−1 in the N base, the figures corresponding respectively to N selected attribute values.

5. The method according to claim 4, wherein the selected attribute is character color, the attribute values corresponding to N different colors which can be selected for the color attribute.

6. The method according to claim 5, wherein the data to be embedded is represented by decimal figures in the 10 base (N=10), each figures 0 to 9 being associated respectively to a color defined by the character color attribute.

7. The method according to claim 4, wherein two attributes are used in combination so that each of the figures 0, 1, 2, . . . N−1 in the N base corresponds respectively to a combination of a selected value of a first attribute and a selected value of a second attribute.

8. The method according to claim 7, wherein the second attribute is the "italic" format of a character, the attribute value corresponding to "italic" or "non italic".

9. A method of authenticating a text document received by a communication system wherein the text document includes hidden integrity information which has been embedded in the document by modifying selected invisible attributes on space characters, comprising:

transforming the text document into a canonical form by setting values of the selected attributes to a same default value on all inter-word intervals of the received document, computing from the text document the integrity information used for the authentication, encoding the integrity information as an ordered set of values corresponding to the different values of the selected attributes, replacing on each space character of a predetermined set of space characters, default attribute values by the corresponding values of the ordered set of values to obtain an encoded text document, comparing the encoded text document with the received text document to authenticate the received text document.

10. The method according to claim 9, wherein the integrity information used for the authentication of the text document is a Message Authentication Code (MAC) computed with a one-way hash function over the text document, the integrity information being computed with the use of a secret key.

11. A method of authenticating a text document received by a communication system wherein the text document includes hidden integrity information which has been embedded in the document by modifying values of selected invisible attributes on space characters, comprising:

transforming the text document into a canonical form by setting values of the selected attributes to a same default value on all inter-word intervals of the received document, computing the integrity information as an ordered set of values corresponding to the different values of the selected attributes, extracting the modified values of attributes from the space characters, recovering the encoded integrity information from the extracted modified values of attributes, and comparing the computed integrity information with the recovered integrity information in order to authenticate the received text document.

12. The method according to claim 11, wherein the integrity information used for the authentication of the text document is a Message Authentication Code (MAC) computed with a one-way hash function over the text document, the integrity information being computed with the use of a secret key.

13. A system for invisibly embedding and hiding data into a text document by modifying selected invisible attributes of invisible characters on a plurality of inter-word intervals of the text document, comprising:

means for selecting at least one attribute that is invisible on space characters used as inter-word intervals;

means for transforming the text document into a canonical form by setting values of the selected attribute to a same default value on all inter-word intervals of the document;

means for encoding the data to be embedded and hidden into the text document as an ordered set of values corresponding to the different values of the selected attribute;

means for selecting a set of inter-word intervals among all inter-word intervals in the text document corresponding to a set of space characters to be used for embedding and hiding the data into the text document; and means for replacing on each space character of the set of space characters, default attribute values by the corresponding encoded data.

14. A system for authenticating a text document received by a communication system wherein the text document includes hidden integrity information which has been embedded in the document by modifying selected invisible attributes on, comprising:

means for transforming the text document into a canonical form by setting values of the selected attributes to a same default value on all inter-word intervals of the received document;

means for computing from the text document, the integrity information used for the authentication;

means for encoding the integrity information as an ordered set of values corresponding to the different value of the selected attributes;

means for replacing on each space character of a predetermined set of space characters, default attribute values by the corresponding values of the ordered set of values to obtain an encoded text document; and means for comparing the encoded text document with the received text document to authenticate the received text document.

15. A system for authenticating a text document received by a communication system wherein the text document includes hidden integrity information which has been embedded in the document by modifying values of selected invisible attributes on space characters, comprising:
- means for transforming the text document into a canonical form by setting values of the selected attributes to a same default value on all inter-word intervals of the received document;
- means for computing the integrity information as an ordered set of values corresponding to the different values of the selected attributes;
- means for extracting the modified values of attributes from the space characters;
- means for recovering the encoded integrity information from the extracted modified values of attributes; and
- means for comparing the computed integrity information with the recovered integrity information in order to authenticate the received text document.

16. A computer program product for invisibly embedding and hiding data into a text document by modifying selected invisible attributes of invisible characters on a plurality of inter-word intervals of the text document, comprising:
- a computer readable medium having computer readable program code embodied therein, the computer readable program code comprising:
- computer readable program code configured to select at least one attribute that is invisible on space characters used as inter-word intervals;
- computer readable program code configured to transform the text document into a canonical form by setting values of the selected attribute to a same default value on all inter-word intervals of the document;
- computer readable program code configured to encode the data to be embedded and hidden into the text document as an ordered set of values corresponding to the different values of the selected attribute;
- computer readable program code configured to select a set of inter-word intervals among all inter-word intervals in the text document corresponding to a set of space characters to be used for embedding and hiding the data into the text document; and
- computer readable program code configured to replace on each space character of the set of space characters, default attribute values by the corresponding encoded data.

17. A computer program product for authenticating a text document received by a communication system wherein the text document includes hidden integrity information which has been embedded in the document by modifying selected invisible attributes on, comprising:
- a computer readable medium having computer readable program code embodied therein, the computer readable program code comprising:
- computer readable program code configured to transform the text document into a canonical form by setting values of the selected attributes to a same default value on all inter-word intervals of the received document;
- computer readable program code configured to compute from the text document, the integrity information used for the authentication;
- computer readable program code configured to encode the integrity information as an ordered set of values corresponding to the different value of the selected attributes;
- computer readable program code configured to replace on each space character of a predetermined set of space characters, default attribute values by the corresponding values of the ordered set of values to obtain an encoded text document; and
- computer readable program code configured to compare the encoded text document with the received text document to authenticate the received text document.

18. A computer program product for authenticating a text document received by a communication system wherein the text document includes hidden integrity information which has been embedded in the document by modifying values of selected invisible attributes on space characters, comprising:
- a computer readable medium having computer readable program code embodied therein, the computer readable program code comprising:
- computer readable program code configured to transform the text document into a canonical form by setting values of the selected attributes to a same default value on all inter-word intervals of the received document;
- computer readable program code configured to compute the integrity information as an ordered set of values corresponding to the different values of the selected attributes;
- computer readable program code configured to extract the modified values of attributes from the space characters;
- computer readable program code configured to recover the encoded integrity information from the extracted modified values of attributes; and
- computer readable program code configured to compare the computed integrity information with the recovered integrity information in order to authenticate the received text document.

* * * * *